(12) United States Patent
Kairouz

(10) Patent No.: US 7,380,753 B2
(45) Date of Patent: Jun. 3, 2008

(54) COMPOSITE MATERIAL STRUCTURE

(75) Inventor: Kays C Kairouz, Bristol (GB)

(73) Assignee: Airbus UK Limited, Bristol (GB)

( * ) Notice: Subject to any disclaimer, the term of this patent is extended or adjusted under 35 U.S.C. 154(b) by 610 days.

(21) Appl. No.: 10/487,457

(22) PCT Filed: Sep. 6, 2002

(86) PCT No.: PCT/GB02/04046

§ 371 (c)(1),
(2), (4) Date: Feb. 24, 2004

(87) PCT Pub. No.: WO03/022677

PCT Pub. Date: Mar. 20, 2003

(65) Prior Publication Data
US 2004/0244334 A1    Dec. 9, 2004

(30) Foreign Application Priority Data
Sep. 13, 2001    (GB) ................... 0122050.8

(51) Int. Cl.
*B64C 1/06* (2006.01)
(52) U.S. Cl. .................................. 244/123.1
(58) Field of Classification Search ............ 244/123.1, 244/119, 120, 117 R
See application file for complete search history.

(56) References Cited

U.S. PATENT DOCUMENTS 4,219,980 A    9/1980 Loyd
4,657,615 A    4/1987 Braun et al.
5,358,583 A    10/1994 Hatchadoorian et al.
6,561,459 B2 *    5/2003 Amaoka et al. ............ 244/123

FOREIGN PATENT DOCUMENTS

| EP | 0580423 A1 | 1/1994 |
|----|-----------|--------|
| EP | 1031406 A1 | 8/2000 |
| EP | 1151850 A2 | 11/2001 |
| WO | 00/37244 A1 | 6/2000 |

* cited by examiner

*Primary Examiner*—Tien Dinh
(74) *Attorney, Agent, or Firm*—Nixon & Vanderhye P.C.

(57) ABSTRACT

A laminated composite material structure, in the form of a load-bearing rib of a wing of an aircraft, comprises an upper laminated portion, which is angled with respect to a middle laminated portion, and a curved corner portion being continuous with and interposed between the upper and middle portions. (The rib has a curve that connects the upper and middle portions, which are perpendicular or transverse to each other). The corner portion is in the form of a kinked portion or joggled, that is, the portion includes two regions of positive curvature (concave regions) and a region of negative curvature (convex region) interposed therebetween, whereby the formation or propagation of delaminations or cracks at the bend between the middle and upper portions, due to fuel pressure loading and low through-thickness strength, may be reduced.

9 Claims, 3 Drawing Sheets

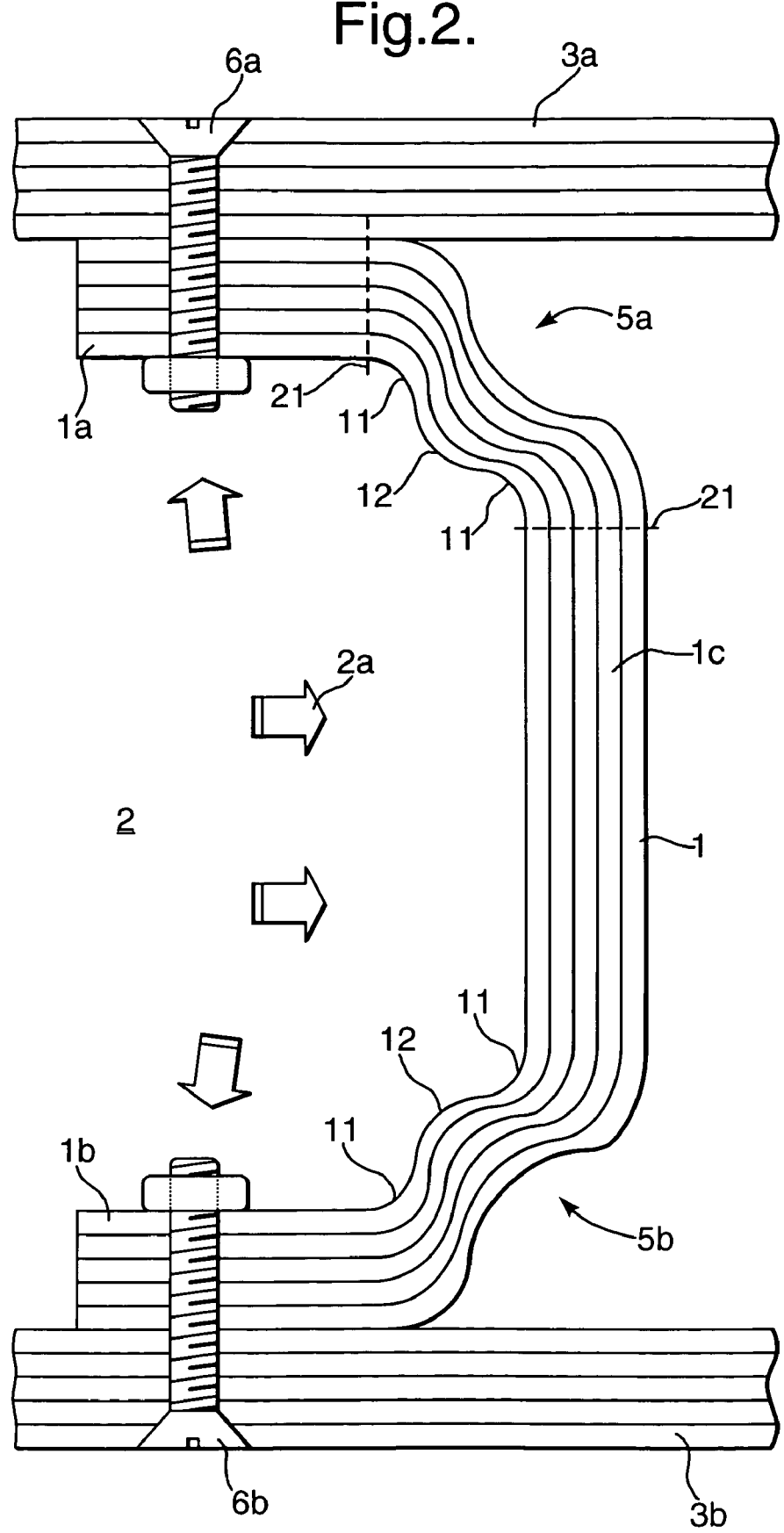

Figure 1:
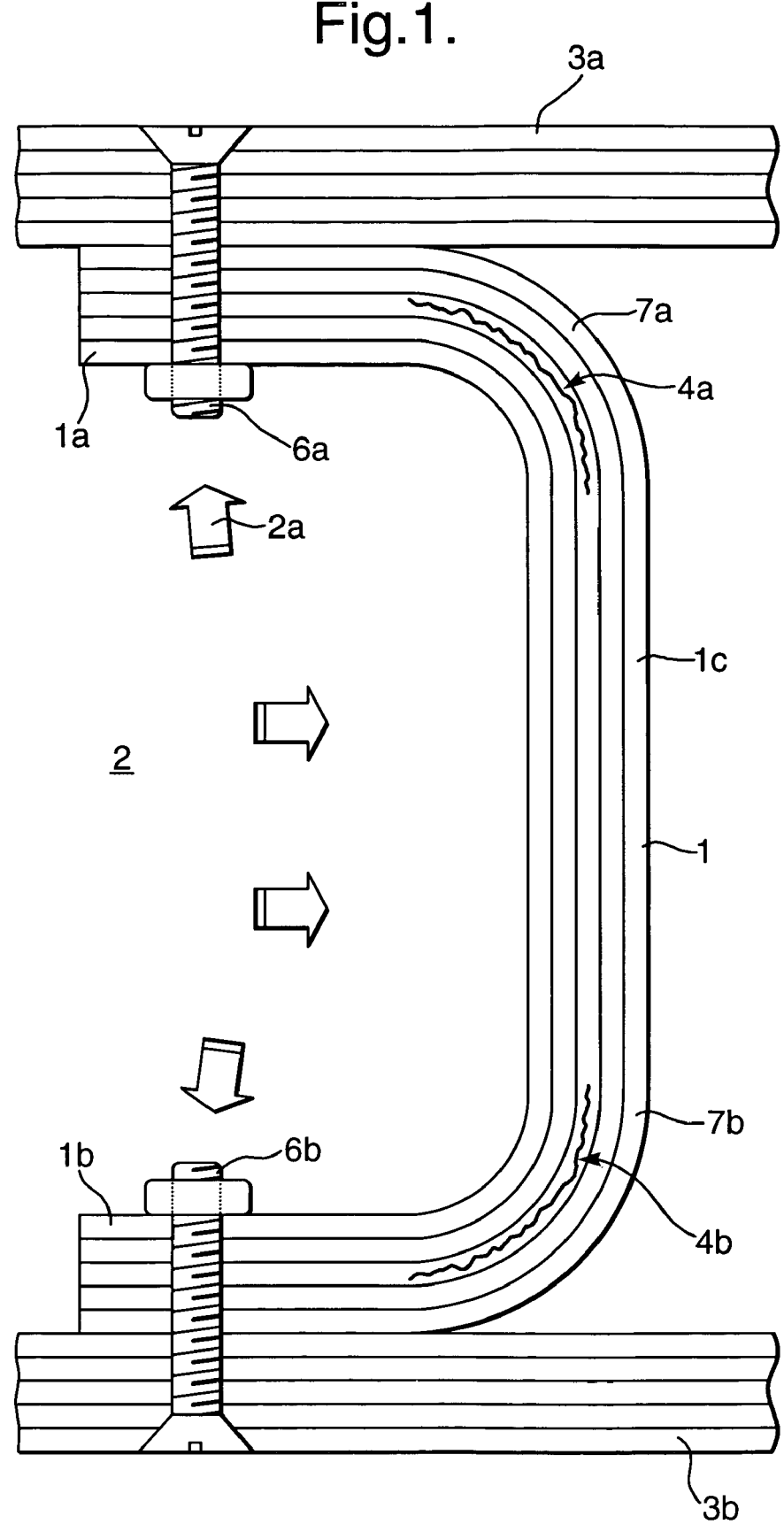

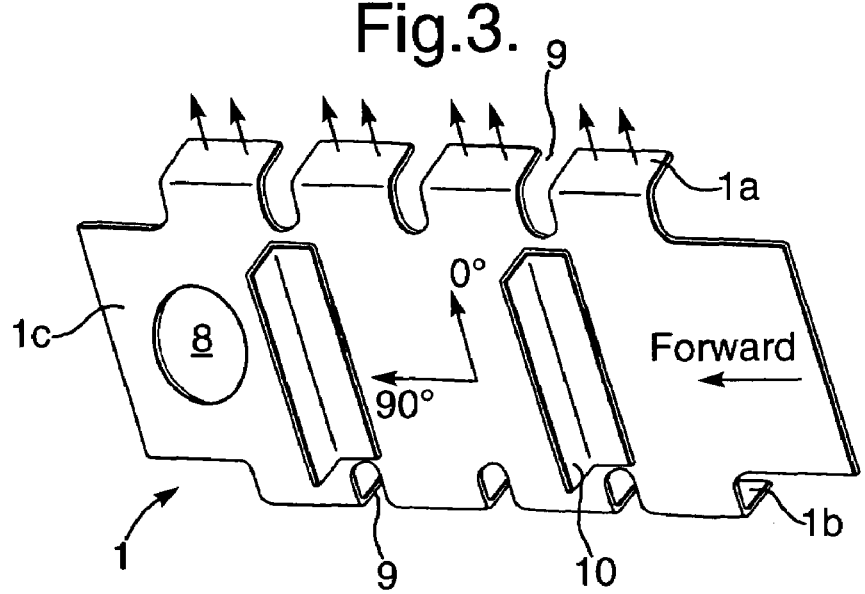
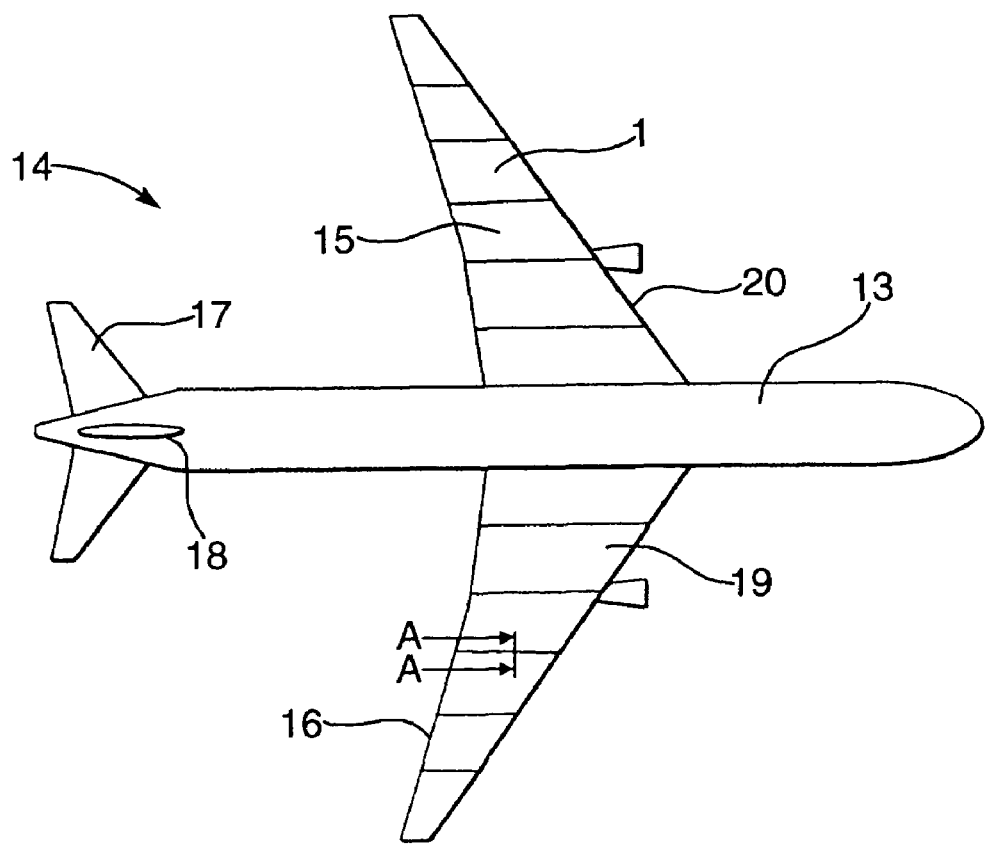

COMPOSITE MATERIAL STRUCTURE

This application is the US national phase of international application PCT/GB02/04046 filed in English 6 Sep. 2002, which designated the US. PCT/GB02/04046 claims priority to GB Application No. 0122050.8, filed 13 Sep. 2001. The entire contents of these applications are incorporated herein by reference.

This invention relates to a laminated composite material structure for forming a part of an aircraft, and an aircraft wing structure or aircraft including such a laminated composite material structure.

The use of laminated composite materials in the aerospace industry is well known. Composite materials have been successfully used in wing skins of aircraft for example. It has been proposed that laminated composite materials could be used in components having a more complicated shape, for example a rib of a wing of a passenger carrying aircraft. It is common for such components to be subjected to various loads in use and for such components to have angled portions (portions that extend away from one another at an angle, commonly a right angle).

It has been found during trials that there are various problems associated with using such laminated composite materials in load bearing components having angled portions. In particular, laminated materials commonly suffer from having low through-thickness strength, that is, the material may be prone to failure when exposed to (relatively low) tensile forces in a direction normal to the layers of the material. Such forces are not necessarily applied directly to the material, but may be generated within the material as a reaction to external forces that are applied.

FIG. 1 illustrates an example of the problems that may arise when using laminated composite materials having low through-thickness strength. FIG. 1 shows schematically, in cross-section, a section of a wing including a generally C-shaped rib 1, made of laminated composite material, attached to an upper wing skin 3a and to a lower wing skin 3b. Fuel 2 stored in the space defined between the rib 1 and the wing skins 3a, 3b exerts forces, schematically represented by arrows 2a, on the rib 1 (for example, because the fuel occupies only part of the available space and is thus able to move inside the wing structure and collide with the rib 1 or because the fuel is stored, possibly accidentally, under pressure). The rib 1 includes two angled portions 7a, 7b, where portions of the rib 1 curve through 90 degrees. In use, the forces exerted on the rib 1 are such that the angled portions 7a, 7b are urged to open out to a greater angle, thereby urging the inner and outer surfaces of the angled portions away from each other. Such forces can cause the layers of the laminated composite material to delaminate and/or cracks to form in the regions of the angled portions 7a, 7b (FIG. 1 shows such cracks/delaminations schematically as faults 4a, 4b). Once such cracks and/or delaminations are formed they can quickly propagate through the structure.

It is an object of the invention to provide a laminated composite material structure for forming a part of an aircraft, wherein the structure has an angled portion with improved resistance to delamination and/or cracking.

According to the invention there is provided a laminated composite-material structure for forming a part of an aircraft, the structure comprising first and second laminated portions angled with respect to each other and a third laminated portion being continuous with and interposed between the first and second laminated portions, wherein the third laminated portion includes a region of positive curvature and a region of negative curvature.

By introducing regions of both positive and negative curvature in the third portion, the flexibility of the third portion may be improved in comparison to the case where the first and second portions are separated only by a portion having a constant radius of curvature. Such increased flexibility reduces the likelihood of delamination and/or cracks from forming.

Thus, the provision of the regions of both positive and negative curvature in the third portion is advantageously for the purpose of increasing the flexibility of the third portion, whereby the risk of delamination may be reduced.

The arrangement of the invention may also assist in arresting or limiting the propagation of cracks and/or delaminations. Such faults propagate more easily when the layers of the composite material are in tension. By having regions of opposite curvature, at least one region of the third portion may be under much less tension than would otherwise be the case. Such a region may even be in compression through the layers. Such compressive forces may assist greatly in arresting or limiting crack propagation and arresting or limiting delamination.

Furthermore, the present invention may assist in the manufacture of components incorporating the structure of the invention. It is known that, when manufacturing laminated composite materials having curved surfaces, after the fibre layers of the material have been laid and the material has been set in resin, there is a certain amount of shrinkage during processing. This shrinkage can cause curved surfaces to "spring-in", that is, the curvature of the surface has a tendency to increase (i.e. the radius of curvature decreases). Whilst it is possible to predict, to a limited extent, the amount of spring-in a given component may undergo, it would of course be desirable to reduce the effect. Having, regions of both positive and negative curvature in the third portion may therefore be of further advantage in that it may limit the effect of "spring-in" after manufacture of a given component.

In most cases, the regions of positive and negative curvature will be positioned one after the other in the direction from the first and second laminated portions. The regions of positive and negative curvature are preferably arranged one directly after the other with little or no regions of zero (or near zero) curvature therebetween.

Of course, the significance of there being both a region of positive curvature and a region of negative curvature is that there is a first region of curvature of one sign (either positive or negative) and a second region of curvature, which is opposite in sign to the first, so that if the first region of curvature is positive, the second region of curvature is negative, and vice versa.

It will be understood that the regions of positive curvature and negative curvature may be considered as comprising a concave region and a convex region.

At least one of the regions of curvature may have a cross-section in the general form of an arc having a substantially constant radius of curvature. It will be understood that, depending on the thickness of the laminated portions, the radius of curvature on one side of the structure may be significantly different from the radius of curvature on the opposite side of the structure. In such a case, the radius of curvature of the arc may, for the sake of convenience, be taken as the radius of curvature of the middle of the structure. The regions of constant curvature may of course be interposed between regions of zero and/or varying curvature. The substantially constant radius of curvature may be of a size that is the same (within a factor of 10) as the average thickness of the first and second laminated portions.

The third portion preferably includes a first region of curvature positioned between second and third regions of curvature of the opposite sign to that of the first region of curvature. The regions of curvature are advantageously positioned one after the other in the direction between the first and second laminated portions. The first region preferably has a curvature having a magnitude that is not greater than that of either the curvatures of the second and third regions of curvature. For example, the first region has a radius of curvature that is not greater than the radius of curvature of either of the radii of curvature of the second and third regions of curvature. Preferably, the average radii of curvature of the regions of curvature of the third portion are within a factor of 4, more preferably a factor of 2, of each other. The radii of curvature of the second and third regions of curvature may be substantially equal. The third portion may have one or more corrugations and may be generally corrugated in shape.

The first and second laminated portions may be curved in shape (for example, the first and second laminated portions may have a generally sinusoidal shape). Generally, but not necessarily, the first and second laminated portions are conveniently substantially planar. It should be noted however that the first and second laminated portions may have a gently curving surface whilst still being considered as being substantially planar.

The first and second laminated portions may be at an angle of between 60° and 120° to each other and may for example be transverse to each other.

Preferably, the first, second and third portions have a substantially constant cross-section, the cross-section including all of the first, second and third portions.

The structure may form at least a part of a rib for a wing of an aircraft. In the embodiment described below the structure is a rib of a wing of an aircraft. In the case where the structure forms a rib, or a part thereof, the first portion of the structure may form at least a part of the portion of the rib which attaches the wing skin to the rib. Such a rib may include two integrally formed parts, each part being of a construction in accordance with the structure of the present invention, the first portions of each structure forming the respective portions of the rib that enable the upper and lower wing skins, respectively, to be attached to the rib.

The structure may be used to advantage in other parts of an aircraft and the structure may for example form at least a part of any of the following aircraft components or systems: a spar, a spar for a wing, the sub-structure of the wing box, an aileron, a flap, a spoiler, a tail-plane, a part of the fuselage frame, or the fuselage.

The invention further provides an aircraft wing structure including a structure of the invention described herein, for example, including a rib incorporating the structure of the invention. The invention yet further provides an aircraft including a structure of the invention as described herein, for example, including a wing structure as described immediately above.

The invention is described further, by way of example, with reference to the accompanying drawings, in which:

FIG. 1 is a schematic view of a section of a wing structure illustrating the problems that the invention seeks to mitigate, FIG. 2 is a schematic (and not to scale) view of a section of a wing structure having a rib including two joggles, FIG. 3 is a schematic perspective view of the rib shown in FIG. 2, and FIG. 4 is an aircraft incorporating the rib of FIG. 2.

A brief description of the rib 1 shown in FIG. 1 is given above.

FIG. 2 shows a part of a wing structure which includes rib 1 bolted to upper and lower wing skins 3a, 3b (shown in part only in the Figures), the rib being made from laminated composite material. The cross-section of the rib 1 in the region of the section illustrated in FIG. 2 is substantially constant and is generally C-shaped. Fuel 2 is stored in the space defined between the rib 1 and the wing skins 3a, 3b. In use, the fuel exerts forces, schematically represented by arrows 2a, on the rib 1. The rib 1 has: a generally planar upper portion 1a which facilitates connection to the upper wing skin 3a, by means of bolts 6a; a generally planar lower portion 1b which facilitates connection to the lower wing skin 3b, by means of bolts 6b, the upper and lower portions being generally parallel to and spaced apart from each other; and a middle generally planar portion 1c interposed between and connecting the upper and lower portions 1a, 1b, via corner portions of the rib 1, the middle portion 1c being generally perpendicular to each of the upper and lower portions 1a, 1b. It will be understood that the upper, middle and lower portions 1a, 1b, 1c of the rib 1 are formed as a monolithic structure.

The upper and lower portions 1a, 1b of the rib shown in FIG. 1 are each connected to the middle portion 1c by means of a simple curved portion (or bend) 7a, 7b. Each curved portion 7a, 7b has a substantially constant radius of curvature. The rib 1 of FIG. 2 differs from that shown in FIG. 1 in that the respective portions of the rib 1 interposed between the upper portion 1a and the middle portion 1c and between the lower portion 1b and the middle portion 1c are in the form of joggles 5a, 5b. It will be understood that in the context of the present invention a joggle may be in the form of a kink, corrugation, triple-bend (or higher order bend), or the like in the rib 1. Each joggle 5a, 5b is of course integrally formed with the portions of the rib 1 that it joins.

The joggles 5a, 5b shown in FIG. 2 comprise two regions 11 of positive curvature (concave regions, when viewed from the inside of the C-shaped rib) and a single region 12 of negative curvature (a convex region, when viewed from the inside of the C-shaped rib) positioned therebetween. (Of course, depending on one's viewpoint, the joggle could be considered as comprising a single region of positive curvature disposed between two regions of negative curvature.) The radii of curvature of the regions 11 of positive curvature are each 13 mm. The radius of curvature of the region 12 of negative curvature is 9 mm. By way of comparison, the thickness of the rib in the region of the joggles is about 4 mm. The rib 1 described with reference to the drawings is in the wing in a region close to the fuselage and is therefore relatively thick. The ribs nearer the tips of the wings might, for example, may have a thickness of about 5 mm or less.

The shape of each joggle 5a, 5b is such that the shortest distance along the surface of the joggle, between the notional boundaries 21 between the portions to either side of the joggle, is longer than would otherwise be the case (compare with the corner joints 7a, 7b of the rib 1 of FIG. 1, for example). Thus, if the rib 1 is extended by a given distance the mechanical strain suffered by the joggle 5a, 5b may be relatively less, and thus the stresses within the corner portion may be relatively less.

Moreover, the joggles 5a, 5b each have a shape that generally curves and weaves, the shape not being extremely convoluted. Thus, with reference to the upper joggle 5a of FIG. 2, the shape does not deviate greatly from the notional path directly linking the notional boundaries 21 between the joggle and the portions 1a, 1c either side thereof. Thus, the shape is such that the direction at any point along the notional route described by the joggle 5a moving from one boundary 21 to the other boundary 21 includes a positive component in the general direction from the one boundary to the other.

FIG. 3 shows the general shape of the rib 1 (the joggles being omitted for the sake of clarity). As can be seen in FIG. 3, the cross-section is, in several regions, substantially constant. The rib 1 does not, however, have a constant cross-sectional shape throughout its length. For example, the rib 1 includes a cut-out 8, of circular cross-section, in the middle portion 1c. In this example the cut-out 8 is provided to allow the passage of internal fuel pipes (not shown). There are many design reasons why the cut-out 8 may be present, including to allow the passage of fuel pipes, such as for lightening the structure or for fuel transfer. Also, there are cut-outs 9 in the region of the boundary between the middle portion 1c and the upper portion 1a and in the region of the boundary between the middle portion 1c and the lower portion 1b, those cut-outs 9 being provided to allow stringers (not shown in FIG. 3), also know as stiffeners, to pass through the rib 1. Thus the joggles are not continuous along the length of the rib 1. The rib 1 also includes vertical rib stiffeners 10 provided to improve the load bearing capability of the rib 1.

The composite fibre and matrix material, which forms the rib 1, comprises a series of plies of carbon fibre set in epoxy resin material (although the fibres could be set in a thermoplastic matrix). With a given ply, all the fibres run in the same direction: in some plies that is the vertical direction (referred to hereinafter as 0°) as shown in FIG. 3; in other plies it is plus or minus 45° to that direction and in still other plies it is at 90° to that direction. Of course it should be understood that these ply directions are simply examples of a typical material and that many other directions of fibres may be employed.

As the rib 1 is required to withstand complex loading including both bending and shear loads, the lay-up of fibres will include a combination of plies in different directions. Different lay-ups are used for the different regions of the rib. For example, the middle portion 1c (commonly referred to as the web of the rib) may have lay-ups ranging from 10/80/10 (i.e. 10% in the 0° direction, 80% in the ±45° direction and 10% in the 90° direction) for ribs that are mostly exposed to shear loads to 30/40/30 for ribs that are exposed to greater bending loads. In the present embodiment the lay-up of the rib 1 in the middle portion 1c is 25/50/25 (i.e. quasi-isotropic). The upper and lower portions of the rib 1a, 1b (commonly referred to as the rib feet) may have a lay-up varying from 25/50/25 (quasi-isotropic) to 50/40/10 (rib feet bending). In the present embodiment the lay-up of the rib 1 in the upper and lower portions 1a, 1b is 25/50/25. Thus there is no variation in the lay-up across the rib in the region of the joggle. (Whilst the rib may have differing lay-ups in different regions it is preferred that the lay-up in the region of the joggle is substantially the same.) The rib 1 is formed of sixteen layers of fibre material (only five layers are shown in FIG. 2 for the sake of clarity). The rib 1 may be formed in an appropriately shaped mould in accordance with known manufacturing techniques.

The inclusion of joggles 5a, 5b in the rib 1 shown in FIG. 2 gives rise to many advantages. In comparison to the simple single-curve corners of the rib 1 illustrated by FIG. 1, the joggles 5a, 5b of the rib of FIG. 2 i) provide extra flexibility at the corners, ii) lower the strain in the material in the corner portion of the rib and iii) introduces compression through-thickness forces (in the region 12 of negative curvature), all three of which reduce the problems associated with delamination or the formation of cracks (and the propagation thereof) at the corners caused by the stresses imposed on the rib 1 by, for example, the fuel 2. Also, the shape of the joggles helps reduce the effects of "spring-in" of the rib after manufacture.

FIG. 4 shows an aircraft 14 comprising a fuselage 13, wings 19, tail-plane 17 and fin 18. The wings 19, being conventional in structure, are formed of a front wing spar 20 and a rear wing spar 16, in the region of the leading and trailing edges, respectively, of the wing 19. Attached to and between the spars 16, 20 are ribs 1. Each rib is of the general form described with reference to the rib 1 shown in FIG. 2 (FIG. 2 showing the rib in the cross-section taken along the line A-A of FIG. 4). The invention is particularly, but not exclusively, applicable to larger aircraft such as passenger carrying aircraft or freight carrying aircraft.

It will be appreciated that various modifications could be made to the above-described embodiment without departing from the scope of the present invention. For example, the upper, middle and lower portions of the rib need not be planar in form and the rib could instead be sinusoidal in shape along its length. Also, the joggles described above could be used to advantage in other structural parts of an aircraft, where such parts are required to have bends or corners. The present invention is of particular advantage in the case where the structural part is a load bearing structure, for example, a structure that, in use, is subjected to non-trivial loads. For example, the spars of a wing of an aircraft might be made from a laminated composite material incorporating joggles.

The invention claimed is:

1. A laminated composite material structure for forming a part of an aircraft, the structure comprising first and second laminated portions angled with respect to each other and a third laminated portion being continuous with and interposed between the first and second laminated portions, wherein the third laminated portion includes at least one unsupported region of positive curvature and at least one unsupported region of negative curvature for increasing flexibility of said third laminated portion.

2. A structure according to claim 1, wherein at least one of the regions of curvature has a cross-section in the form of an arc having a substantially constant radius of curvature.

3. A structure according to claim 1, wherein the third portion includes a first region of curvature positioned between second and third regions of curvature of the opposite sign to that of the first region of curvature.

4. A structure according to claim 1, wherein the first and second laminated portions are transverse to each other.

5. A structure according to claim 1, wherein the direction at any point along the notional route described by the third portion moving from the first portion to the second portion includes a positive component in the direction from the boundary between the first and third portions to the boundary between the third and second portions.

6. A structure according to claim 1, wherein the structure is a load bearing structure.

7. A structure according to claim 1, wherein the first portion of the structure forms at least a part of the portion of a rib for a wing of an aircraft, the portion of the rib being attachable to a wing skin of an aircraft.

8. An aircraft wing structure including a structure as claimed in claim 1.

9. An aircraft including an aircraft wing structure as claimed in claim 8.

* * * * *